(No Model.) 2 Sheets—Sheet 1.

W. D. LATTA.
COTTON CHOPPER.

No. 590,107. Patented Sept. 14, 1897.

WITNESSES
A. B. Diggs
H. S. Daniels

INVENTOR
William D. Latta
Per
Thomas P. Simpson
Attorney (No Model.) 2 Sheets—Sheet 2.

W. D. LATTA.
COTTON CHOPPER.

No. 590,107. Patented Sept. 14, 1897.

WITNESSES
A. B. Diggs
H. A. Daniels

INVENTOR
William D. Latta,
Per
Thomas P. Simpson
Attorney

UNITED STATES PATENT OFFICE.

WILLIAM D. LATTA, OF HOLLIDAY, TEXAS.

COTTON-CHOPPER.

SPECIFICATION forming part of Letters Patent No. 590,107, dated September 14, 1897.

Application filed February 10, 1897. Serial No. 622,731. (No model.)

*To all whom it may concern:*

Be it known that I, WILLIAM D. LATTA, a citizen of the United States, residing at Holliday, in the county of Archer and State of Texas, have invented certain new and useful Improvements in a Combined Cultivator and Chopper; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to make a combined cultivator and chopper which will work on both sides of a row of cotton-plants and chop out the superfluous plants.

Figure 1:
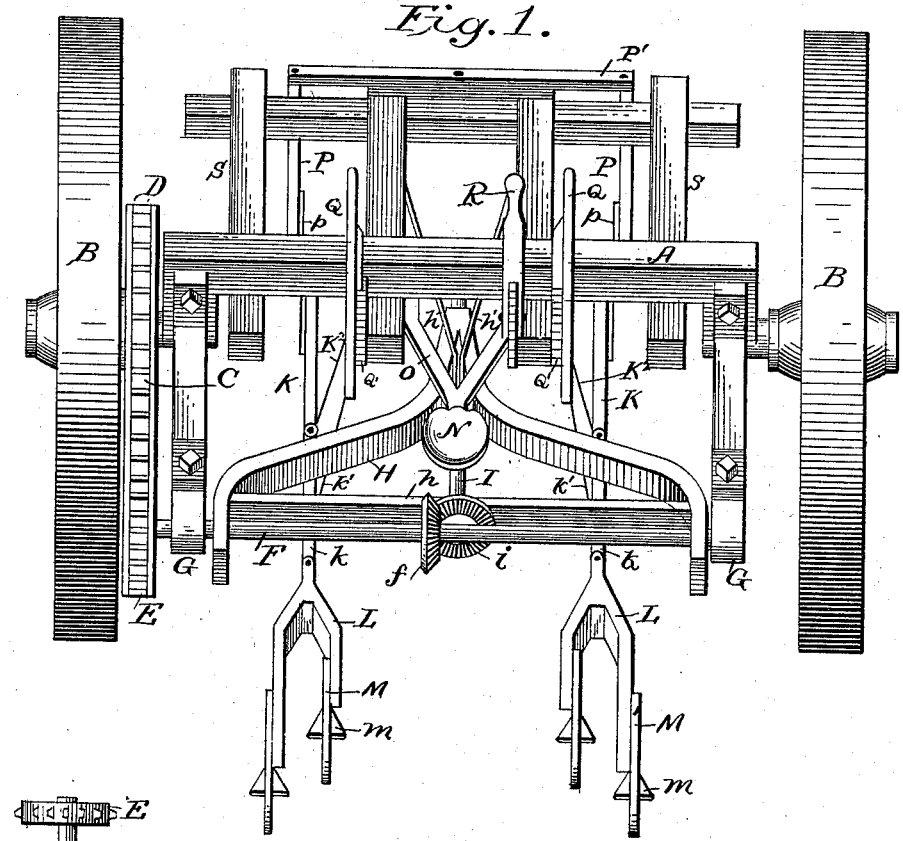
Figure 2:
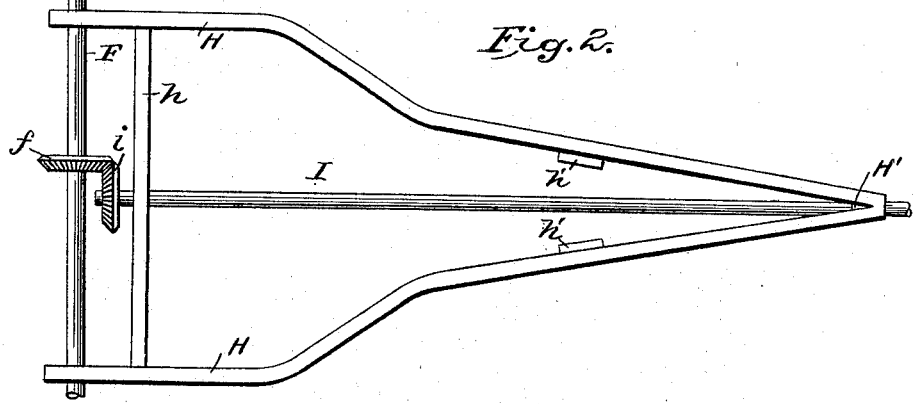
Figure 3:
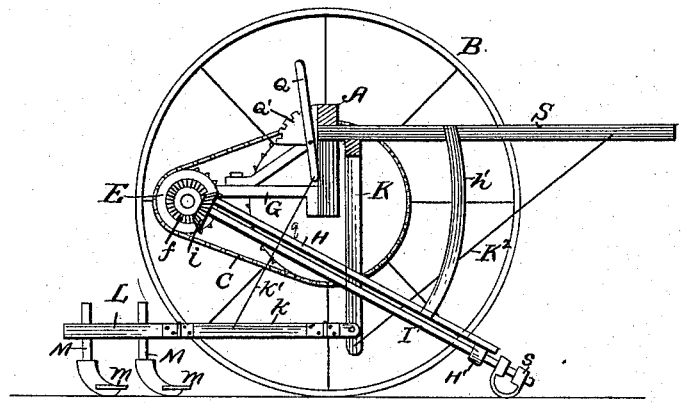
Figure 4:
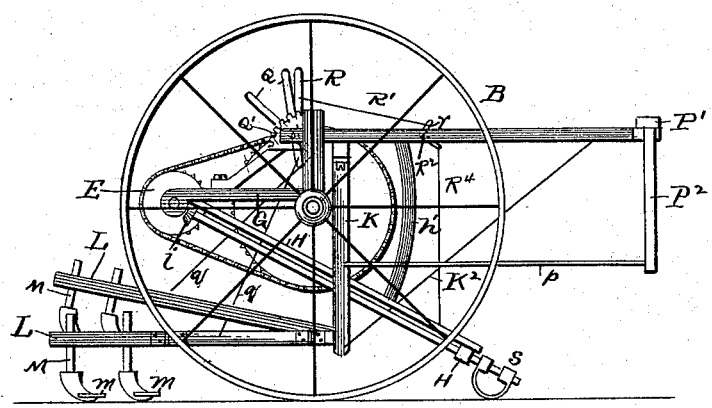

Figure 1 of the drawings is an isometrical perspective view of my implement; Fig. 2, a detail plan view; and Figs. 3 and 4, elevations in vertical longitudinal section.

In the drawings, A represents a crank-axle, upon which turn two wheels B B, one of which carries on the inner side of its hub the large sprocket-wheel D, which is connected by a chain C with a sprocket-pinion E, which is fast on the cross-shaft F. The latter is journaled in the horizontal bars G G, attached to the axle, and has the fast bevel spur-wheel $f$, which gears with a bevel-pinion $i$ on the rotary longitudinal shaft I, which is journaled in a bearing H' of the frame H, so as to revolve a cotton-chopper S.

S is a frame with the beams L and front draft-bar P', and from it proceeds the rods $h'$ $h'$, which support the front end of the frame H.

K K are hangers braced in front by rods K² and the rods $p$ P², while near the bottom are rearwardly pivoted the beams L, pivoted so as to have vertical play and carrying the plows $m$, with the standards M. The beams L are jointed in front of the plows at two points, so as to turn laterally in order to give the plowman perfect freedom in the movements of his plows to avoid obstructions.

It will be perceived that the plows work in pairs, one pair traveling on each side of the row to cultivate the plants, while the chopper $s$ revolves across the row to cut out the superfluous plants.

Q Q are levers fulcrumed on frame H, and whose front ends are connected by cords or wires $q$ with the plow-beams, so that the plows may be held up in turning at the ends of the rows or in going to and from the field.

Q' are ratchets in which work spring-pawls on the levers Q, so as to hold the plows at the desired height.

The axle A may be turned by the lever R in the wheels so as to raise the front of frame S, and with it the chopper $s$.

R' is a rod extending forwardly to the crank on the end of short shaft R², which has a second arm connecting by an end-pivoted rod R⁴ with the chopper-frame H, which can thus be raised in turning at the ends of rows or going from place to place.

On a supporting-frame O is arranged the seat for the driver who guides the horses, so that they will straddle the row while a man manages each pair of the plows.

Having thus described all that is necessary to a full understanding of my invention, what I claim as new, and desire to protect by Letters Patent, is—

1. In a combined cultivator and chopper, the frame H downwardly inclined toward the front and provided in its bearings with two shafts at right angles to each other, a bevel-gear to connect said shafts and a sprocket-pinion on the transverse shaft, in combination with a sprocket-wheel fast to a hub of one of the loose ground-wheels and connected by a chain with the said sprocket-pinion; whereby the chopper is revolved from a ground-wheel by the train of mechanism specified.

2. In a combined cultivator and chopper, the combination with the connected frames H S, of the rod R', and shaft R², the latter having a crank-arm on one end and an arm connected by an end-pivoted rod with the frame H; whereby the chopper may be raised and lowered in the manner and for the purpose set forth.

In testimony whereof I affix my signature in presence of two witnesses.

WILLIAM D. LATTA.

Witnesses:
J. H. WIGHAM,
J. W. WIGHAM.